July 22, 1969 R. FORTIER 3,457,160
APPARATUS FOR GENERATING OZONE
Filed Dec. 19, 1966 3 Sheets-Sheet 1
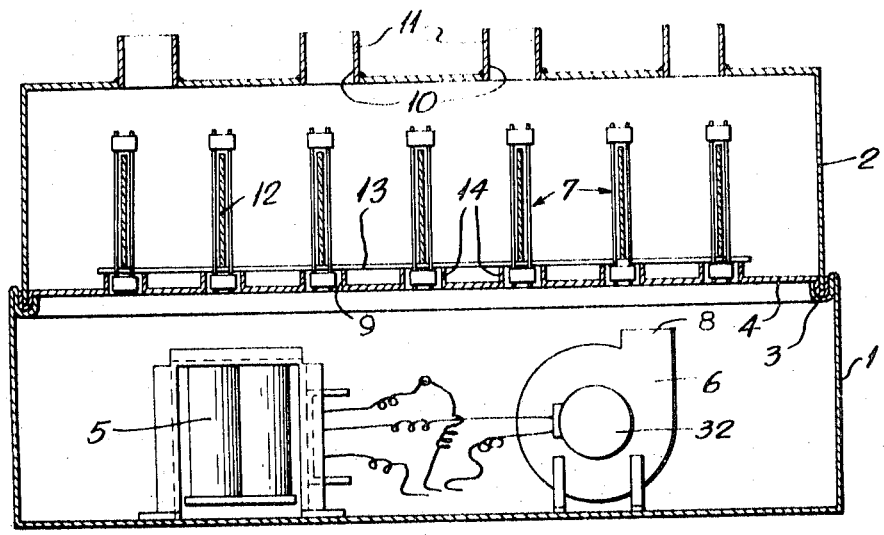
Fig. 2
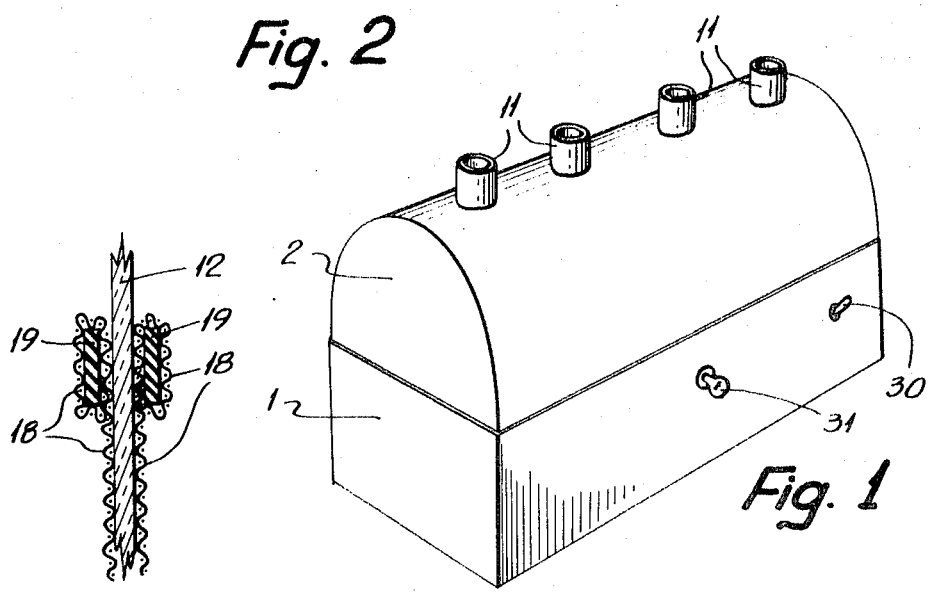
Fig. 6
Fig. 1
INVENTOR
Roland FORTIER
Pierre Lespérance
AGENT

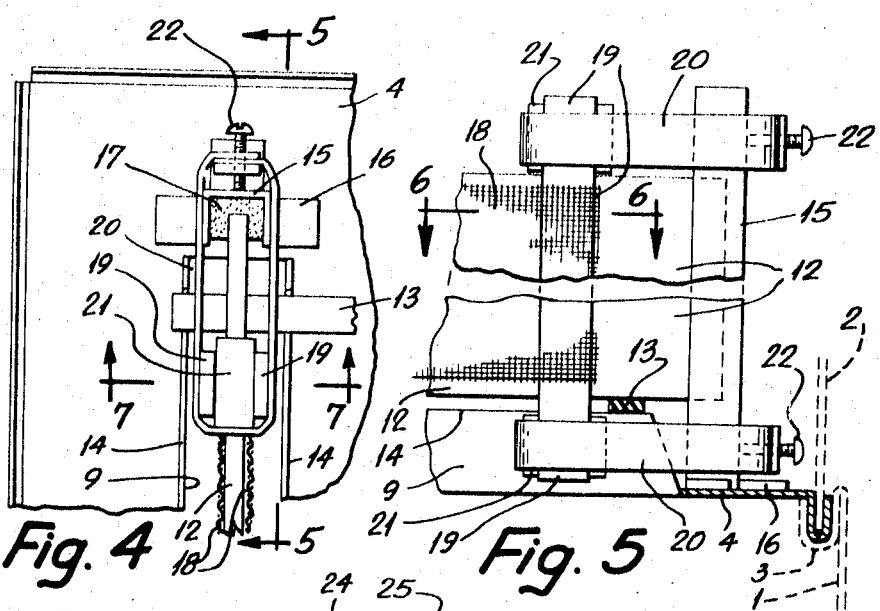
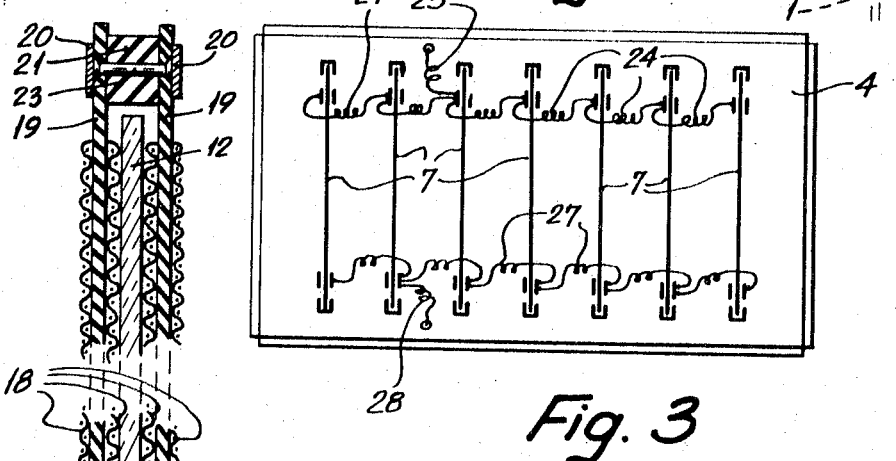
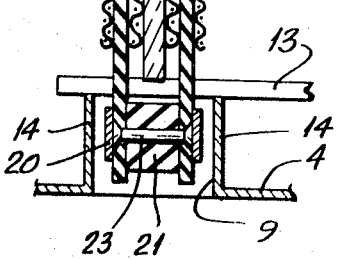

United States Patent Office 3,457,160
Patented July 22, 1969

3,457,160
APPARATUS FOR GENERATING OZONE
Roland Fortier, Thetford Mines, Quebec, Canada, assignor to Climabec Inc., North Thetford Mines, Quebec, Canada
Filed Dec. 19, 1966, Ser. No. 602,633
Int. Cl. C01b 13/12
U.S. Cl. 204—319     5 Claims The present invention relates to an apparatus for generating ozone for purifying air and also water and for eliminating bad odors.

The general object of the present invention resides in the provision of an ozone generator of the character described, of improved construction.

A more specific object of the invention resides in the provision of an ozone generator of the character described, having improved means for maintaining the pair of spaced electrodes at an exact distance apart on each side of a dielectric plate, so as to obtain a very uniform electric discharge over the entire areas of the two electrodes, thereby obtaining a maximum production of ozone relative to the size of the electrodes.

Another important object of the present invention resides in the provision of an apparatus of the character described, provided with means for circulating the air through the apparatus and for circulating the ozone generated by the apparatus into a room, the air of which is to be purified.

Another object of the present invention resides in the provision of an apparatus of the character described, in which the electrodes are submitted to mechanical adjustable tension to cause the spacing of the electrode to be uniform over the entire area and also to vary the composition of the other chemical gases generated by the apparatus along the ozone.

Another object of the present invention resides in the provision of a closed gas circuit comprising a room, the air of which is to be purified, an ozone generator in accordance with the invention and a chamber for treating the gases extracted from the room to be purified and which serves to eliminate the spent ozone and the gases chemically combined with said ozone, whereby the purified air is recirculated through the ozone generator and the air charged with a new amount of ozone is returned into the room to be purified.

The foregoing objects and other objects of the invention will become apparent during the following disclosure and by referring to the drawings, in which:

FIGURE 1 is a perspective view of an apparatus for producing ozone in accordance with the invention;

FIGURE 2 is a longitudinal section of the apparatus;

FIGURE 3 is a top plan view of the assembly of the electrodes, in somewhat schematic representation;

FIGURE 4 is a partial top lan view of an assembly of one pair of electrodes;

FIGURE 5 is a partial side elevation and cross-section of the portion shown in FIGURE 4, FIGURE 5 being taken along line 5—5 of FIGURE 4;

Figure 8:
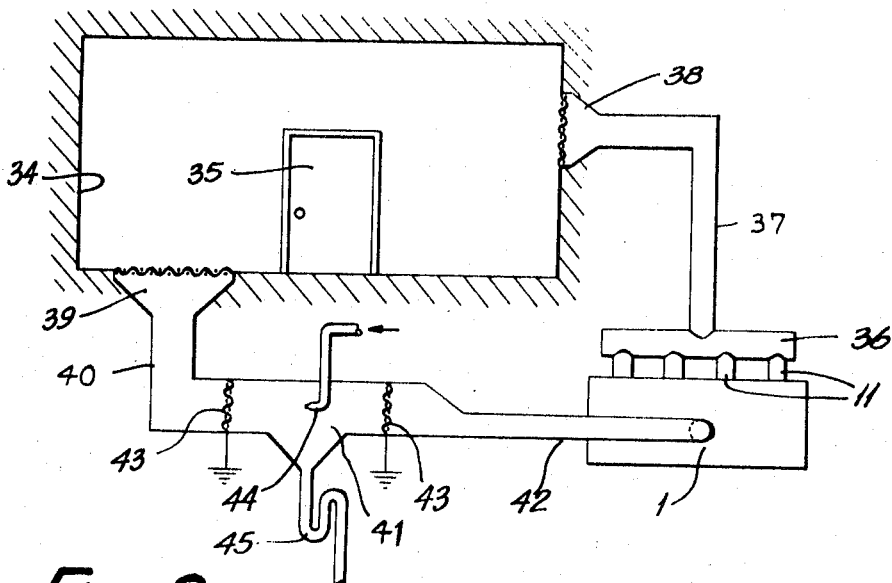
Figure 9:
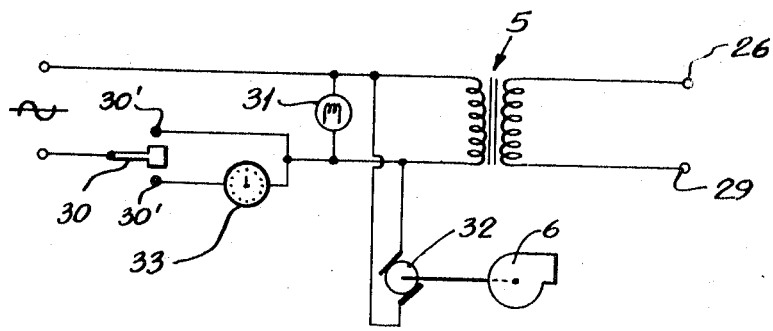

FIGURE 6, which is shown on the first sheet of drawings, is a partial cross-section taken along line 6—6 of FIGURE 5;

FIGURE 7 is a partial cross-section taken along line 7—7 of FIGURE 4;

FIGURE 8 is a schematic representation of the assembly of an apparatus for producing ozone in a closed circuit with a room to be purified; and FIGURE 9 is an electric diagram.

Referring now more particularly to the drawings in which like reference characters indicate like elements throughout, the ozone generator of the present invention comprises a box 1, of generally rectangular shape, provided with a cover 2, of elongated shape and having a curved cross-section, preferably semi-circular.

Cover 2 removably rests in a trough 3 formed by the flanged upper edge of the walls of box 1, said trough 3 being located inside the box. Cover 2 has a height approximately equal to the height of box 1.

A flat shelf 4, of generally rectangular shape, removably rests on trough 3 and forms a partition between the inside of the box and the cover to define two compartments. In the lower compartment defined by box 1 and shelf 4, there are located a high tension transformer 5 and an air blower 6. In the upper compartment defined above shelf 4 and within cover 2, are located a series of electrode assemblies, generally indicated at 7.

Air is sucked in by air blower 6 from the exterior of box 1 through an opening made in the wall thereof and communicating with the blower intake. Blower 6 supplies air under pressure at its outlet 8 located within the lower compartment. Thus, air within said compartment has a pressure higher than atmospheric pressure and escapes through a series of openings 9 made in shelf 4 just underneath each electrode assembly 7 and all along said assemblies.

Openings 9 are of elongated shape of a width slightly greater than the width of the electrode assemblies 7, whereby the air or the gases circulate on each side of said assemblies along the outside of the electrodes.

The gases containing the ozone escape from the apparatus through a series of openings 10 made in the top of cover 2 and constituted by pipes 11, welded or otherwise secured to cover 2 and in communication with the inside thereof.

Each electrode assembly 7 comprises a glass plate 12, of rectangular shape, disposed transversely to the long axis of box 1 and of cover 2 and in a vertical plane, the longitudnal axis of each glass plate being horizontal.

The glass plates 12 of the different electrode assemblies 7 are equally spaced and parallel between themselves. The different glass plates 12 rest at both ends on a common rigid strip 13, made of an electrically insulated material.

There is a strip 13 disposed at each end of the several glass plates 12 transversely thereof, that is longitudinally of box 1. The strips 13 rest in turn on flanges 14 which form a duct for each opening 9.

At each end of each glass plate 12, is disposed a post 15 in alignment with the plate and made of bent sheet metal having a U-shaped cross-section. Post 13 is provided at its lower end with tabs 16 applied against and secured to shelf 4, by welding or otherwise.

The vertical end edge of the glass plate 12 is inserted within the U of the post 15 with the interposition of foam plastic or foam rubber or other electrically insulating material, such as indicated at 17 in FIGURE 4.

Metal screens 18 are applied flat against the opposed main faces of each glass plate 12 and form two electrodes. The screens 18 are constituted of woven metal wire forming openings or mesh of a size corresponding to the mesh size of conventional insect screens, or slightly larger, the wire of the screen being made either copper, brass, galvanized iron or stainless steel. Copper or brass is prefered when treating sulphur dioxide laden air discharged from a paper manufacturing plant; stainless steel is preferred when the ozone is injected in water; galvanized iron is used for normal applications.

Screens 18 have a generally rectangular shape having a height slightly smaller than the height of the glass plate 12 against which they are applied.

Each screen 18 terminates short of the ends of plate 12 and the terminal portion of the screens 18 is wound around mechanical tension bar 19. There is a tension bar 19 disposed on each side of glass plate 12 and at each end thereof inwardly of post 15.

The tension bars 19 are rigid and protrude from the upper and lower longitudinal edges of the glass plate 12 and are attached to post 15 by means of loops 20 surrounding bars 19 and post 15.

A block 21 is disposed between the ends of the pair of tension bars 19 and serves as a rest for the loop 20, while the other end of the loop 20 is provided with a screw 22 threaded therein and bearing against post 15. Screws 22 at the top and bottom of the post serve to adjust the mechanical tension to which the screens 18 are subjected. Blocks 21 at the top and bottom ends of the pair of opposite bars 19 are secured to said bars by rivets 23 or the like.

All the screens 18 on one side of the glass plate 12 are parallel-connected by high voltage electric wires 24. Said wires are attached to the said screens at one end thereof. A common wire for all of these screen electrodes, indicated at 25, extend through shelf 4 and is connected to one terminal of the secondary of the high voltage step-up transformer 5, this terminal being shown at 26 in FIGURE 9.

The other ends of the other screen electrodes of each pair of electrodes are parallel-connected by a high voltage wire 27 and by a common wire 28 extending through shelf 4 and connected to terminal 29 of the secondary of high voltage transformer 5.

The primary of transformer 5 is provided with a switch 30 located at one side of the box, as shown in FIGURE 1, and the circuit of the primary of the transformer comprises also a parallel-connected pilot lamp for indicating that the apparatus is in operation. The primary circuit also includes a parallel-connected electric motor 32 for operating blower 6.

Switch 30 has double poles 30', one pole being used for manual operation and other pole 30' being used for automatic operation through a clock switch 33 for automatically opening and closing the circuit at appropriate time intervals. Thus, the apparatus can be adjusted to function during about ten minutes for every half-hour or so in accordance with the quantity of ozone desired to be produced.

The primary of the transformer is connected to a conventional source of alternating 110-volt current. The secondary can have a voltage varying between 5,000 and 30,000 volts.

The spacing between the screen electrodes 18 can be adjusted and also the spacing between said screens and the main flat faces of glass plate 12 can be adjusted by inserting a strip of predetermined or selected thickness between the electrodes 18 and the glass plate 12 opposite tension bars 19 or by varying the thickness of blocks 21.

By subjecting the screens 18 to a minimum mechanical tension by tightening screws 22, there is obtained a very uniform spacing between the two electrodes and between these electrodes and the glass plate over the entire area of the electrodes. Moreover, it has been found that by adjusting the spacing between the screen electrodes and the glass plate and by adjusting the mechanical tension to which the screen electrodes are subjected, one can vary the proportion of ozone and other chemical gases produced by the electric discharge between the two electrodes of one pair and which passes through the glass plate 12. The electrode assemblies may be disposed in horizontal planes instead of being vertically mounted as shown in the drawings.

Tests made with the generator in accordance with the invention, more particularly in slaughtering houses, have shown that the generator can eliminate in a very effective way the bad odors emanating from said slaughter houses and also from other industries.

The ozone produced is circulated by blower 6 through a suitable piping which opens in a room to be purified. This room will normally have an exit to the exterior. However, in certain cases, there might be objections to the ozone odor coming out from the room and this is why, in accordance with the invention, a closed circuit has been provided as shown in FIGURE 8. In this figure, the room in which the bad odors have to be eliminated is indicated at 34 and may have one or more access doors 35.

The ozone generator, indicated by box 1, has its outlet pipes 11 in communication with a collector 36, itself communicating with a conduit 37 connected to a register 38 opening into the room 34 near the ceiling thereof. An exhaust register 39 is disposed within or near the floor and communicates with a conduit 40, itself communicating with a treatment chamber 41 in turn communicating with the air intake of blower 6 through tube 42.

Treating chamber 41 is provided at its two ends with screens 43, made of interwoven metal wires, such as galvanized iron, and having very fine mesh, said screen 43 closing the chamber and being electrically grounded. Between the two screens 43, is disposed a water injector 44 supplied with cold water under pressure, for example 100 p.s.i. The chamber 41 is provided with a drain 45. The air from room 34 containing the spent ozone and the bad odor gases which are now chemically combined with the ozone, are sucked into the chamber 41 wherein they come in contact with water vapor or fine water droplets sprayed by injector 44. Ozone which is about ten times as soluble in cold water as air, dissolves in the water along with the gases combined therewith and the liquid is discharged to drain 45. Thus, the air which flows through pipe 42 contains practically no more ozone and no more bad odors. This purified air is again loaded with ozone in generator 1 and the air containing the new amount of ozone is circulated through room 34 through duct 37 and register 38. Instead of injecting cold water in the form of droplets, it is possible, if desired, to inject steam in treatment chamber 41.

It has been found that the grounded screens 43 increase the properties of the chamber 41 to separate the spent ozone from the air.

While a preferred embodiment in accordance with the invention has been illustrated and described, it is understood that various modifications may be resorted to without departing from the scope of the appended claims.

What I claim is:

1. An ozone generator comprising a glass plate, metal screens applied flat against each of the two main faces of said glass plate, a source of electric current at high voltage connected to said metal screens whereby the latter form electrodes, mechanical tension bars secured to each end of each of said screens, transversely of said screens, posts spaced from said bars, adjustable mechanical tension means between said mechanical tension bars and said posts and serving to adjust the mechanical tension of the electrodes along said glass plate, the high electric voltage applied to said electrodes producing an electric discharge between the latter and which passes through said glass plate.

2. An ozone generator as claimed in claim 1, wherein each said post has a U-shaped cross-section, the ends of said glass plate being inserted within the U of said post and maintained in position by said post, said mechanical tension bars being disposed along said glass plate spaced from said post, said adjustable tension means comprising loops surrounding said post and said mechanical tension bars and screws threadedly inserted in said loops and bearing against said post.

3. An ozone generator as claimed in claim 1, further including a shelf supporting said posts, in turn supporting said glass plates in a position spaced from said shelf, said shelf being provided with an opening, of elongated shape, disposed under said electrodes and longitudinally of the same and of a width slightly greater than the total thickness of the assembly of said electrodes and of said glass plate, and power-operated means for producing air under pressure and blowing the same through said opening for said air to move along said electrodes.

4. An ozone generator as claimed in claim 3, further including a box supporting said shelf, said high voltage electric source being located in said box, together with said power-operated means for producing air under pressure, whereby said box contains air under pressure which discharges through said opening in said shelf.

5. An ozone generator as claimed in claim 3, further including a cover covering the assembly of said electrodes and of said glass plate and extending over said shelf, said cover being provided with gas outlet openings.

References Cited

UNITED STATES PATENTS 3,081,215  7/1959  Held et al. _____ 204—313
2,343,338  3/1944  Steel _____ 204—319

JOHN H. MACK, Primary Examiner

S. S. KANTER, Assistant Examiner

U.S. Cl. X.R.

204—313